Feb. 20, 1951  L. E. FORSS  2,542,321
LATERALLY TIPPABLE TRUCK
Filed Sept. 20, 1948  2 Sheets-Sheet 1

Inventor:
Lars Eric Forss

Feb. 20, 1951 — L. E. FORSS — 2,542,321
LATERALLY TIPPABLE TRUCK
Filed Sept. 20, 1948 — 2 Sheets-Sheet 2

Inventor:
Lars Eric Forss

Patented Feb. 20, 1951

2,542,321

UNITED STATES PATENT OFFICE 2,542,321

LATERALLY TIPPABLE TRUCK

Lars Eric Forss, Mjolby, Sweden

Application September 20, 1948, Serial No. 50,187
In Sweden June 8, 1948

2 Claims. (Cl. 298—18)

The present invention refers to laterally tippable trucks pulled by tractors and provided with a box-like platform body, such as are principally used in road work for the conveyance of sand, gravel, broken stones and the like and in the mining industry for the transport of ore, slick and the like. It is an object of the invention to provide a truck, where the tractor driver may deposit the truck load in a place assigned for the purpose without his leaving the tractor. It is also an object of the invention to permit the tractor driver to deposit the load in a string, while the tractor and the truck are in operation. A further object is to permit unloading to the one or the other side, the respective lateral gates being automatically opened thereat, and a final object is to permit the platform body upon unloading to be automatically returned into the horizontal position and to be locked in this position, while the opened lateral gate is locked at the same time.

Figure 1:
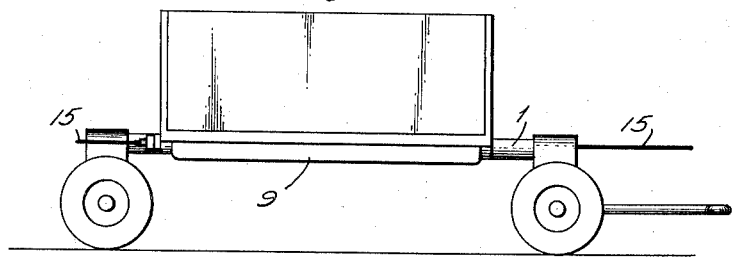
Figure 2:
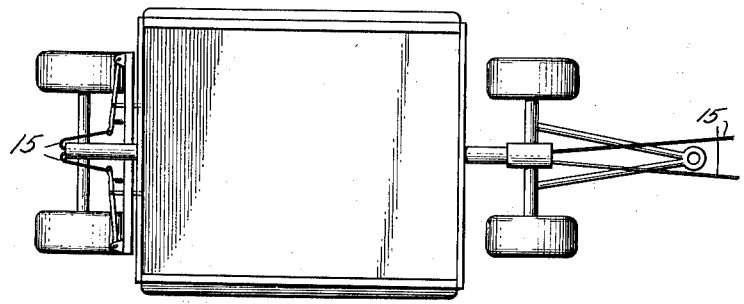
Figure 5:
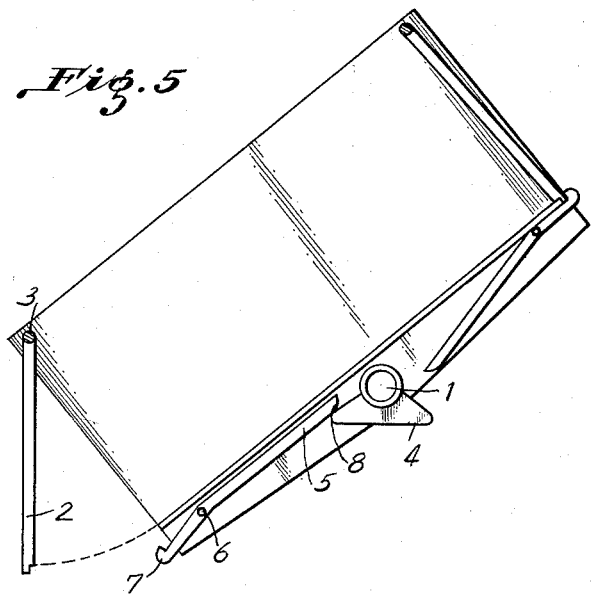
Figure 3:
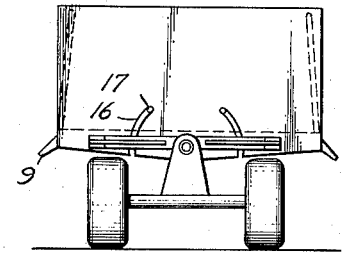
Figure 7:
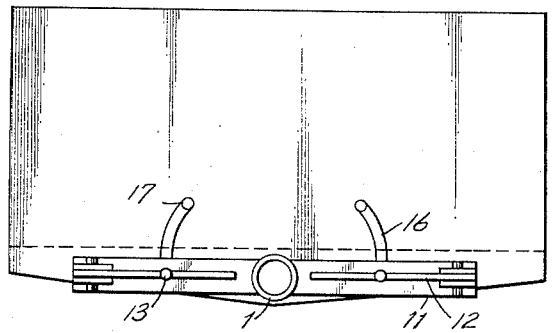
Figure 8:
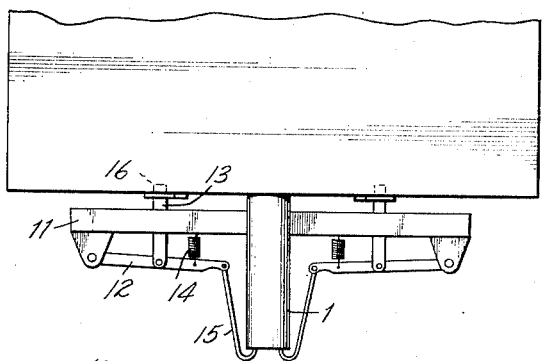
Figure 4:
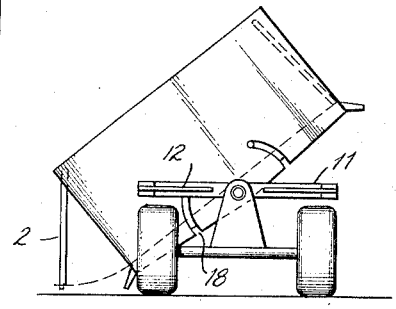
Figure 6:
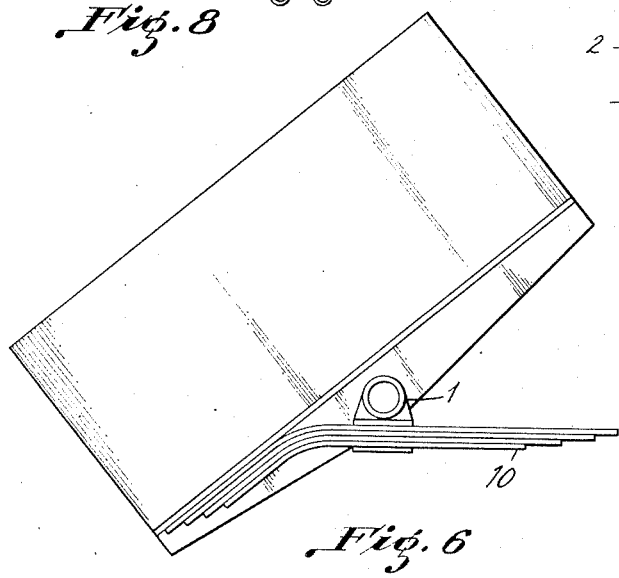

The invention is illustrated in the accompanying drawings. Fig. 1 is an elevation and 2 a plan view of a truck in accordance with the invention. Figs. 3 and 4 show the truck viewed from the rear end, the platform body being shown in its horizontal position in Fig. 3 and in tipping position in Fig. 4. Figs. 5 and 6 show details on a larger scale of the releasing mechanism for the lateral gate and a contrivance for the returning of the platform body into horizontal position upon the tipping having been performed. Figs. 7 and 8 show details of locking bolts viewed from the rear head wall and from above, respectively.

The tube 1 forms a central frame having the platform body pivotally arranged thereon and the cross girders of the driving-wheels secured thereto. The side gates 2 of the platform body are pivoted about journals 3 arranged at the upper edge of the gates. Secured on the tube are one or more substantially triangular cross pieces 4. Provided underneath the bottom of the platform body are levers 5, two for each cross piece, said levers being pivotally arranged about studs 6. The end portion of the levers adjacent to the side gate is formed into a hook 7 gripping about the lower edge of the gate. The other end 8 of the levers is rounded, so that it may slide easily on the cross piece 4 in the tipping operation, the lever being thus turned to bring the hook out of engagement with the side gate, which latter then takes a vertical position, while the load is being discharged.

The longitudinal sides of the platform body are provided at their lower edges with obliquely disposed sled-like slide bars 9 forming a stop device for the tipping movement of the platform body and adapted to slide on the ground, when the truck is moved forward during tipping. Arranged on the tube 1 are one or more groups of leaf springs 10. In tipping, the springs are strained on the corresponding side, and unloading having been effected they return the platform body into the horizontal position. Two pivoted levers 12 are arranged on a transversely extending bar 11 secured on the tube 1 adjacent to one head wall of the platform body, said levers having locking bolts 13 secured thereto, which extend through the bar 11 in guides provided therein. Drawsprings 14 between the levers and the bar tend to press the levers against the bar. Traces 15 are secured to the free ends of the levers facing each other, said traces being extended through the tube 1 to the tractor driver to be actuated by means of a handle, lever, hand wheel or the like. Secured on one head wall of the platform body within reach of the locking bolts provided on both sides of the tube are arcuate wearing prongs 16 having a recess 17 in the upper ends and a downwardly open arcuate slit 18 in the lower ends thereof. When the platform body takes its horizontal position, the locking bolts fall through the action of the springs 14 in beneath the wearing prongs 16 and thus retain the platform body in its horizontal position. When the platform body is tipped to the left, for example, as shown in Fig. 4, the tractor driver releases the left hand locking bolt, tipping then taking place to the left, whereupon he releases the trace, the locking bolt then sliding on the wearing prong in order finally, after the platform body has been brought to an inclination suited for unloading, at an angle of approximately 45°, to snap into the recess 17 so as to lock the platform body during unloading, so that a premature return movement to the horizontal position is prevented. During the tipping movement, the second locking bolt slides out of the arcuate slit 18 so as not to prevent the tipping movement. The unloading or discharge being completed, the tractor driver pulls the trace once more, so that the locking bolt in consideration is released from the recess 17, whereupon the springs 10 return the platform body into its horizontal position.

What I claim is:

1. A laterally discharging tip truck comprising, in combination, a box-like, a laterally tippable platform body pivotally arranged on a tube which forms a central frame and which carries cross girders for the driving wheels of the truck and a number of substantially triangular cross pieces, two levers pivotally mounted underneath said platform body and adapted to slide with one end thereof on said cross pieces, the other ends of said levers being formed into a hook adapted to grip about the lower edge of an outwardly swingable side gate in the horizontal position of the platform body and to release said gate in the tipping of said platform body, through cooperation between said first-mentioned end portions of the levers and said cross pieces; a number of groups of leaf springs on said central frame tube to return the platform body into its horizontal position after the tipping operation has been performed, a transversely extending bar on the central frame tube adjacent to one head wall of the platform body, two levers pivoted on said bar and actuated by a drawspring, locking bolts connected to said levers and extending through said bar, traces secured to the free ends of said last-mentioned levers and extending through said central frame tube to within reach of the tractor driver to be actuated by any suitable operating means, and two arcuate wearing prongs on the head wall of the platform body in front of said locking bolts, the upper ends of said wearing prongs having a recess and the lower ends thereof a downwardly open arcuate slit, said recesses and slits being adapted to cooperate with said locking bolts.

2. A laterally discharging tip truck as claimed in claim 1 and provided with obliquely disposed sled-like sliding bars on the longitudinal sides of the platform body.

LARS ERIC FORSS.

REFERENCES CITED

The following references are of record in the file of this patent:

UNITED STATES PATENTS

| Number | Name | Date |
|---|---|---|
| 980,922 | Carr | Jan. 10, 1911 |
| 1,416,975 | Pullar | May 23, 1922 |
| 1,487,201 | Brezovitz et al. | Mar. 18, 1924 |
| 1,935,974 | Burner | Nov. 21, 1926 |

FOREIGN PATENTS

| Number | Country | Date |
|---|---|---|
| 525,089 | France | of 1921 |